US011346399B2

(12) United States Patent
Edelmann et al.

(10) Patent No.: US 11,346,399 B2
(45) Date of Patent: May 31, 2022

(54) TRANSPORT-SECURING UNIT, METHOD FOR ATTACHING A TRANSPORT-SECURING UNIT, AND METHOD FOR INSTALLING

(71) Applicant: AKTIEBOLAGET SKF, Gothenburg (SE)

(72) Inventors: Ludwig Edelmann, Sulzthal (DE); Roland Haas, Schweinfurt (DE); Dominic Namyslo, Schweinfurt (DE); Matthias Schuler, Stadtlauringen (DE); Johannes Zang, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/101,142

(22) Filed: Nov. 23, 2020

(65) Prior Publication Data

US 2021/0207656 A1  Jul. 8, 2021

(30) Foreign Application Priority Data

Jan. 7, 2020  (DE) ..................... 10 2020 200 086.7

(51) Int. Cl.
| | |
|---|---|
| *F16C 33/46* | (2006.01) |
| *F16C 43/06* | (2006.01) |
| *B21D 53/12* | (2006.01) |
| *F16C 19/36* | (2006.01) |
| *F16C 33/36* | (2006.01) |

(52) U.S. Cl.
CPC ............ *F16C 33/467* (2013.01); *B21D 53/12* (2013.01); *F16C 19/364* (2013.01); *F16C 33/366* (2013.01); *F16C 33/4623* (2013.01); *F16C 43/06* (2013.01)

(58) Field of Classification Search
CPC .............. F16C 33/4623; F16C 33/4629; F16C 33/4635; F16C 41/04; F16C 41/045; F16C 43/06
See application file for complete search history.

(56) References Cited

U.S. PATENT DOCUMENTS 8,713,800 B2 * 5/2014 Friedl .................... F16C 43/06
29/898.09

FOREIGN PATENT DOCUMENTS

| | | | | |
|---|---|---|---|---|
| DE | 102011088720 A1 | | 6/2013 | |
| DE | 102014208235 A1 | * | 11/2015 | .............. F16C 43/06 |
| EP | 0056305 A1 | * | 7/1982 | ............. F16C 41/045 |
| GB | 2377974 A | * | 1/2003 | .............. F16C 43/04 |

\* cited by examiner

*Primary Examiner* — Phillip A Johnson
(74) *Attorney, Agent, or Firm* — J-Tek Law PLLC; Scott T. Wakeman; Mark A. Ussai

(57) ABSTRACT

A transport-securing unit for retaining a plurality of rollers in a rolling-element bearing cage during transportation may include an annular region and a plurality of axially extending, circumferentially spaced projections extending from the annular region. Also, an assembly of the transport-securing unit, a rolling-element cage and a plurality of rollers in pockets of the rolling-element bearing cage, where the transport-securing unit is formed separately from the rolling-element bearing cage, and where the projections extend inside the cage and limit radially inward movement of the rollers relative to the cage.

14 Claims, 4 Drawing Sheets

TRANSPORT-SECURING UNIT, METHOD FOR ATTACHING A TRANSPORT-SECURING UNIT, AND METHOD FOR INSTALLING

CROSS-REFERENCE

This application claims priority to German patent application no. 10 2020 200 086.7 filed on Jan. 7, 2020, the contents of which are fully incorporated herein by reference.

TECHNOLOGICAL FIELD

The present disclosure is directed to a transport-securing unit for securing rollers in a rolling-element bearing cage during transportation.

BACKGROUND

The publication DE 10 2011 088 720 A1 relates to a rolling-element bearing cage including a cage ring as well as a plurality of separating bridges that protrude from the cage ring, and together with the cage ring form pockets for receiving rolling elements. The rolling-element bearing cage is characterized by a plurality of retaining brackets formed separately from the cage ring and bridges, wherein the retaining brackets are attached to the ends of the separating bridges that face away from the cage ring and engage behind, in the circumferential direction, one pocket or two pockets adjacent to the respective separating bridge in order to prevent rolling elements from falling out of the pockets. The retaining brackets provide a transport-securing function.

SUMMARY

A transport-securing unit is disclosed for securing rollers in a rolling-element bearing cage in a single transport of a unit that is formed from the rolling-element bearing cage, the rollers, and the transport-securing unit. The transport-securing unit is a structural unit that is formed separately from the rolling-element bearing cage. A high efficiency can thereby be achieved. In particular, in a constructively simple design, in particular of the cage, a filling of the rolling-element bearing cage with rollers can be achieved away from an assembly line that serves for assembling the rolling-element bearing, since in light of the transport-securing unit transportation is unproblematic. In addition, in particular a retrofitting of cages already produced can occur without needing to modify the design of the cages. In particular, a low expense for realizing a transport-securing can be achieved, since no redesign of the cage and thus no change of a complex injection-molding tool is necessary.

Furthermore, a transport-securing unit is disclosed, in particular as a refinement of the one already-mentioned, that includes a plurality of tongue-shaped elements that are spaced from one another in the circumferential direction of the transport-securing unit. In this way a high efficiency can be achieved. In particular, a simple attaching of the transport-securing unit and a constructively simple design can be achieved.

The transport-securing unit preferably includes at least one annular region at which at least two of the tongue-shaped elements are attached. An economical design can thereby be achieved.

The plurality of tongue-shaped elements each advantageously include at least one tip that is elastically deflectable radially inward with respect to a central axis of the annular region, which central axis extends in its axial direction. A simple reducibility of a diameter of the transport-securing unit at one of its ends can thereby be achieved.

Furthermore, a unit is disclosed including such a transport-securing unit and the rolling-element bearing cage and the rollers.

The transport-securing unit preferably captively secures the rollers in pockets of the rolling-element bearing cage. A positioning of the rollers in the cage can thereby be effected away from a final assembly line of the rolling-element bearing.

The unit is advantageously comprised of the transport-securing unit, the rolling-element bearing cage, and the rollers, and/or the unit is self-retaining. A compact construction can thereby be achieved.

The transport-securing unit preferably includes radially outer-lying regions that are configured to abut against the rollers when the transport-securing unit captively secures the rollers in pockets of the cage. Abutment surfaces for the rollers can thereby be provided on all sides.

Another aspect of the disclosure comprises an assembly that includes a rolling-element bearing cage having a cage interior and a plurality of pockets, a plurality of rollers respectively mounted in the pockets, and a jig removably mounted in the cage interior and holding the rolling elements in the pockets of the bearing cage.

In addition, a method is disclosed for attaching a transport-securing unit to a cage including rollers, wherein at least a part of the transport-securing unit is disposed inside the cage with respect to a radial direction of the cage and inside a set of the rollers. In this way a high efficiency can be achieved. In particular, a low securing effort can be achieved. Furthermore, in particular a reusability of the transport-securing unit can be achieved.

Furthermore, a method is disclosed for assembling a set of rollers that are secured in pockets of a rolling-element bearing cage by a transport-securing unit and the rolling-element bearing cage against an inner ring of a rolling-element bearing, wherein the rolling-element bearing cage and the rollers are pressed toward the inner ring, after which the transport-securing is removed. A high efficiency can thereby be achieved. In particular, a low assembly expense can be achieved.

Further advantages arise from the following description of the drawing. An exemplary embodiment of the invention is depicted in the drawings. The drawings, the description, and the claims contain numerous features in combination. The person skilled in the art will also advantageously consider the features individually and combine them into further meaningful combinations.

DETAILED DESCRIPTION

Figure 1:
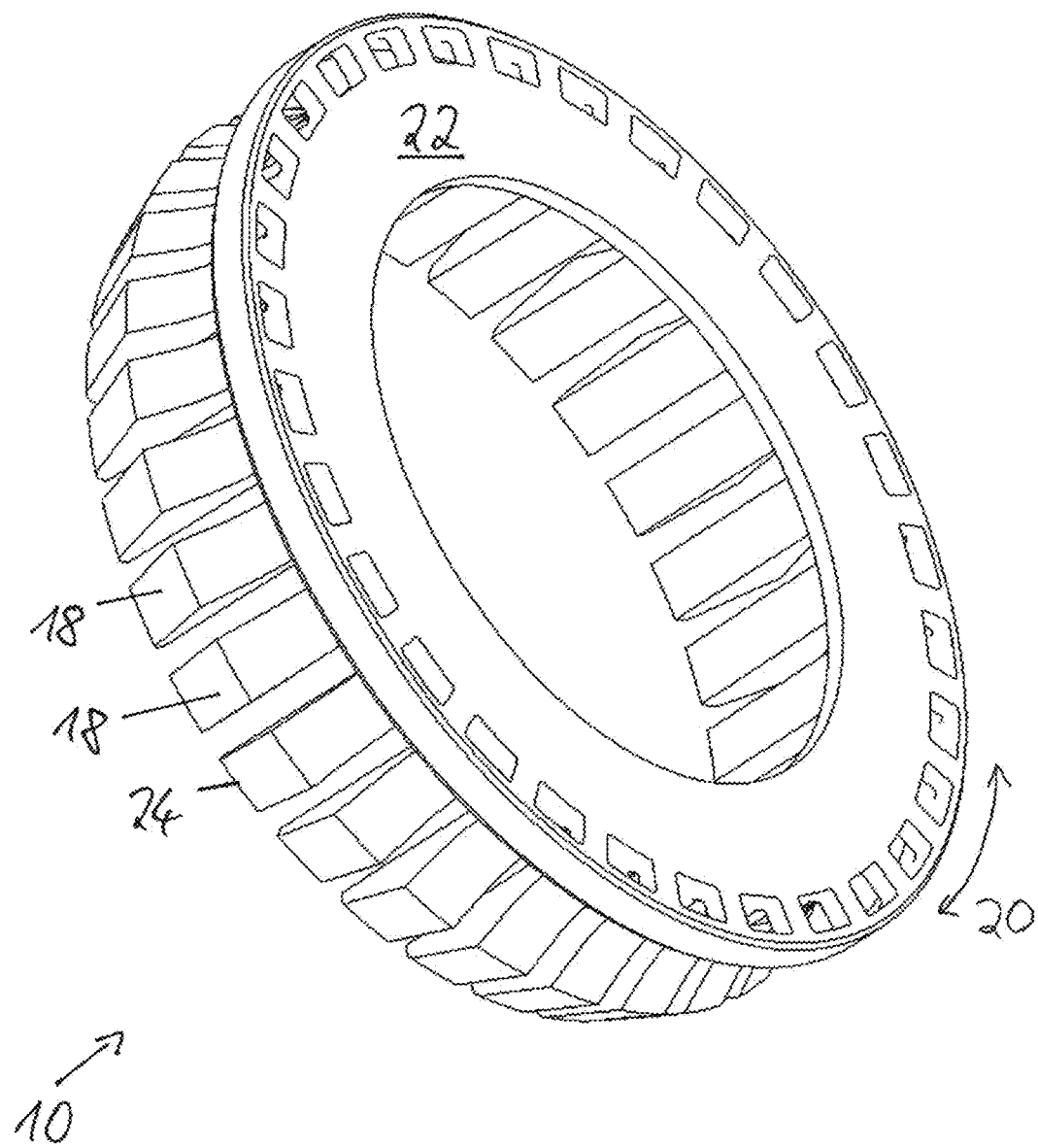
FIG. 1 is a perspective view of a transport-securing unit according to the present disclosure.
Figure 2:
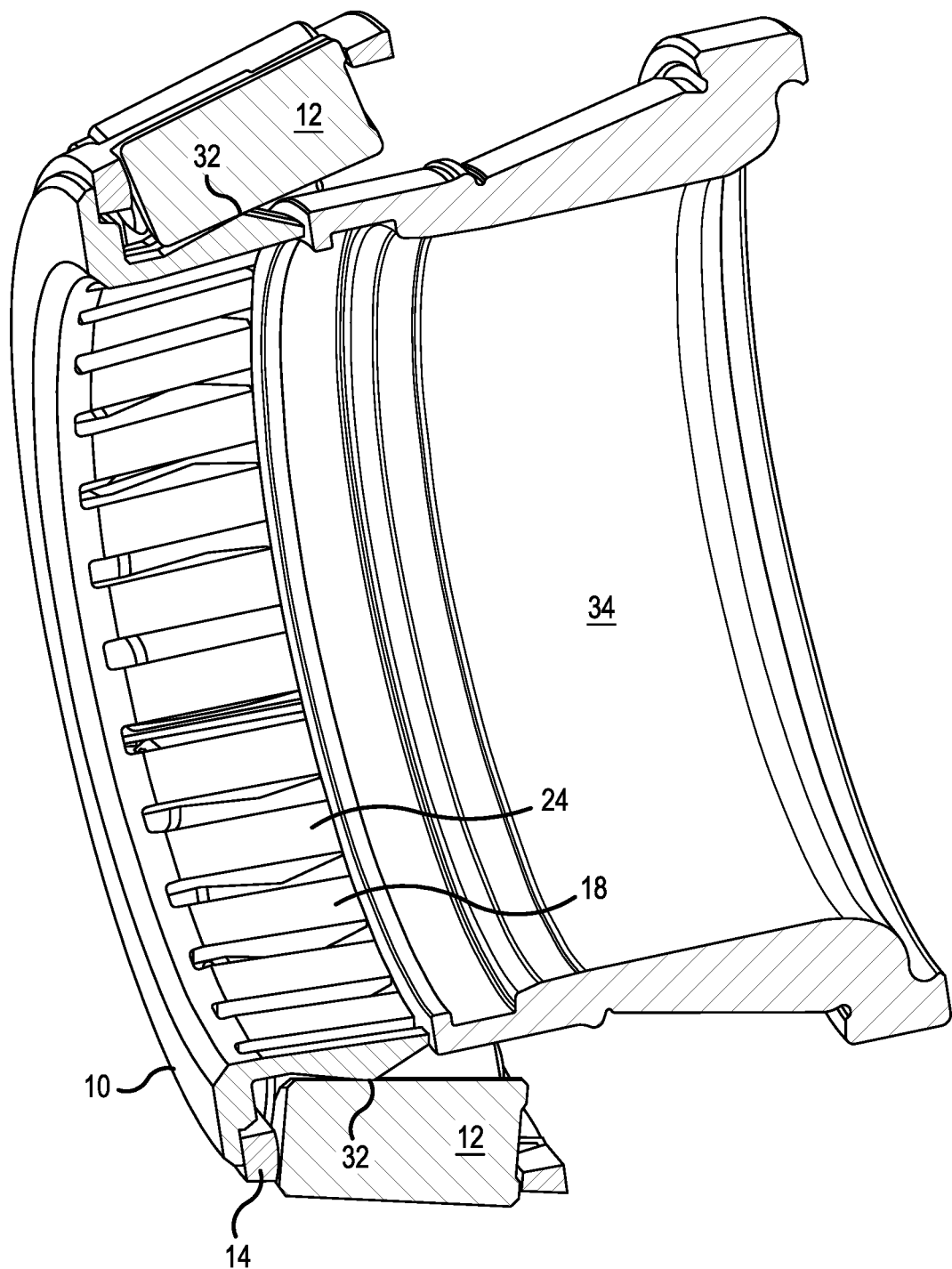
FIG. 2 is a perspective view of a partial section through an inner ring and a unit formed of a transport-securing unit, a cage, and rolling elements during assembly.
Figure 3:
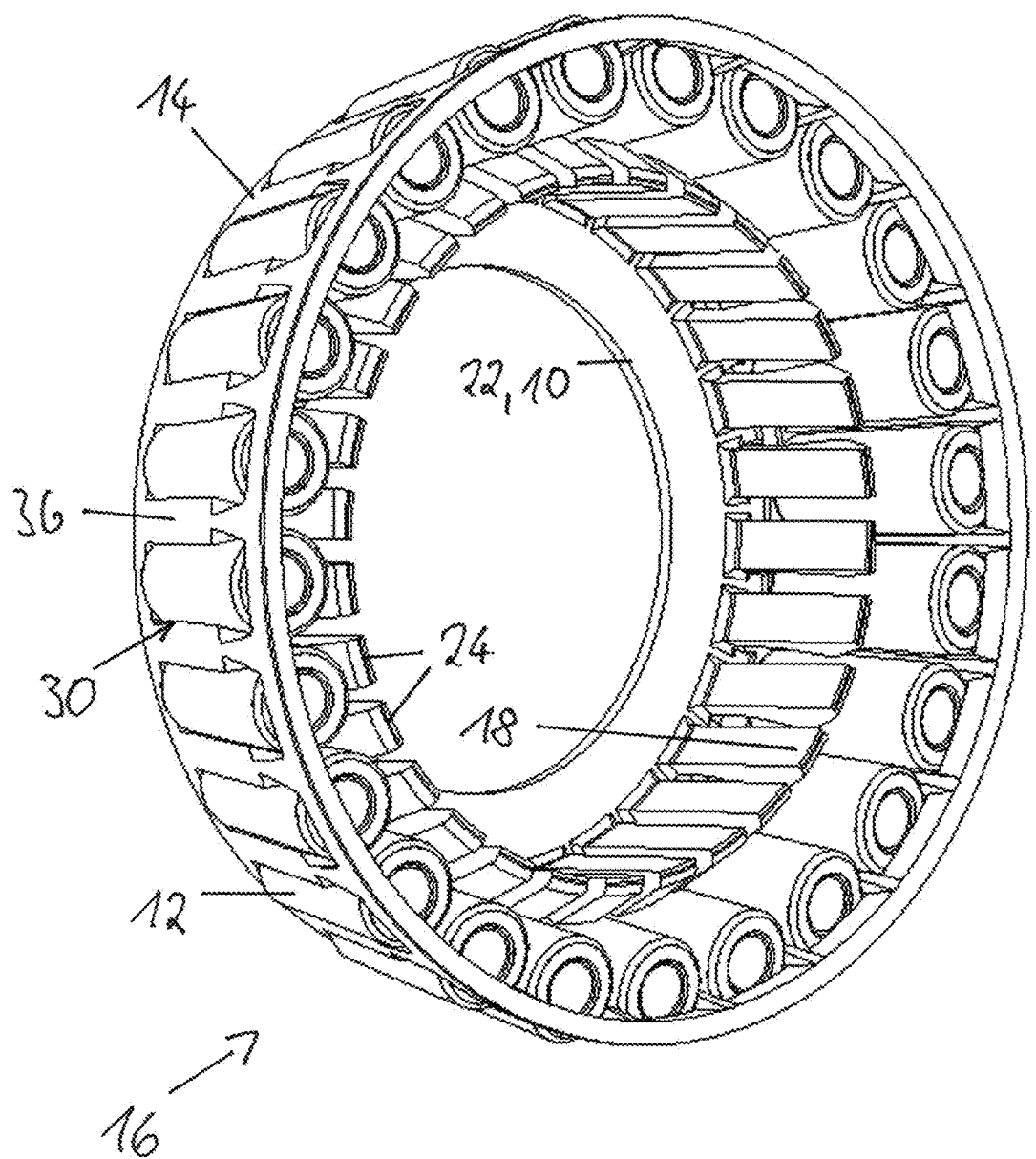
FIG. 3 is a perspective view of the unit of FIG. 2.
Figure 4:
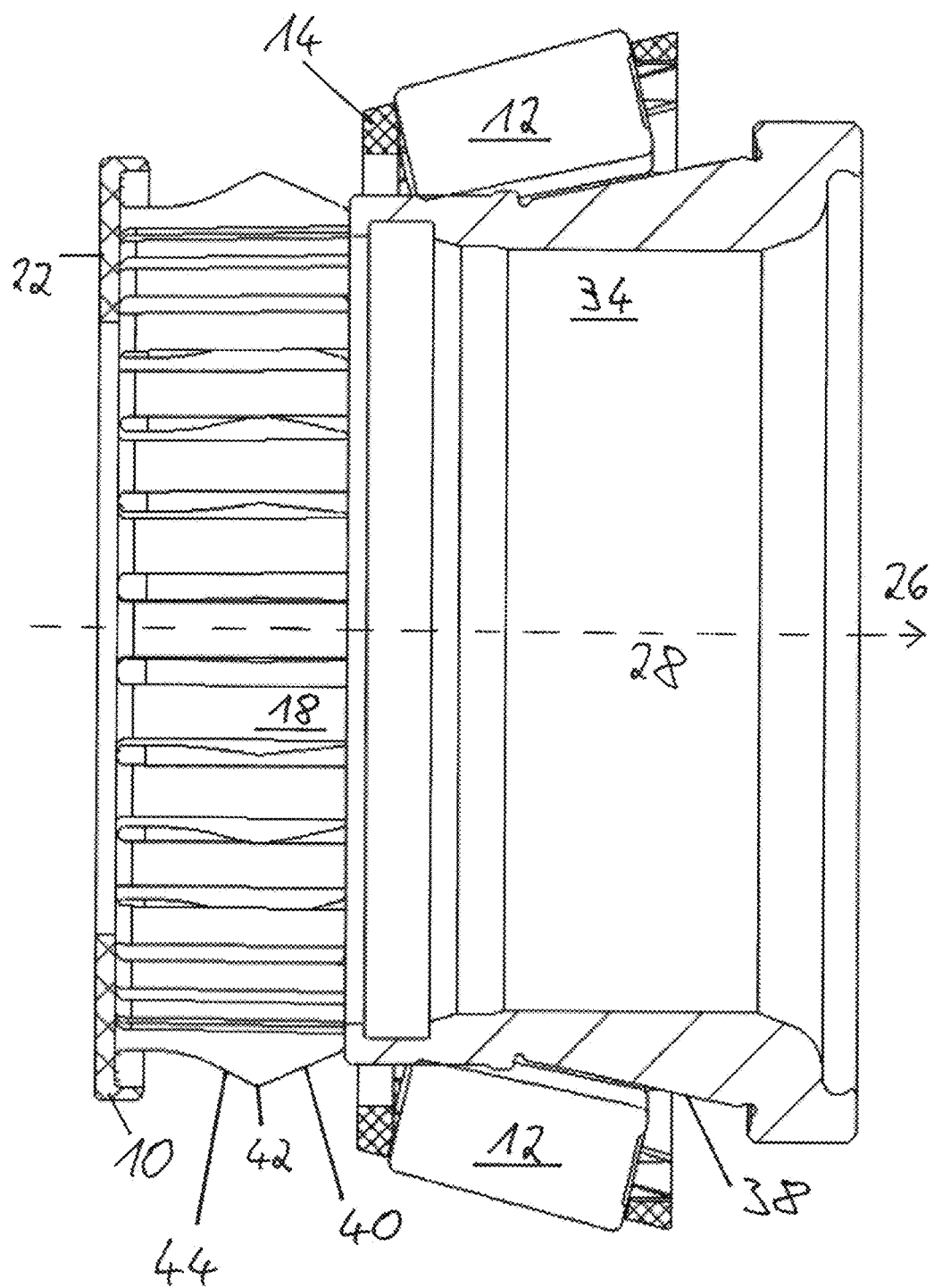
FIG. 4 is an axial section of the unit during an installation process.

FIG. 1 is a perspective view of a transport-securing unit 10, sometimes referred to herein as a "jig," which is suitable for securing rollers in a rolling-element bearing cage 14 (FIGS. 2 to 4). The transport-securing unit comprises an annular region 22 to which a plurality of tongue-shaped elements 18 are attached. More specifically, the tongue-shaped elements 18 are formed one-piece with the region 22. Furthermore, the tongue-shaped elements 18 are disposed uniformly spaced from one another in the circumferential direction 20 of the transport-securing unit. A main direction of extension of the tongue-shaped elements extends essentially in an axial direction 26 of the annular region 22. Furthermore, the tongue-shaped elements each include a tip 24 at an axial end distal from the annular region. With respect to the central axis 28, the tongue-shaped elements are each elastically deflectable radially inward relative to the annular region.

The rollers are tapered rollers of a tapered roller bearing. When a unit made up of the rolling-element bearing cage 14, rollers 12 disposed in pockets 30 of the rolling-element bearing cage 14, and the transport-securing unit is to be transported without the rollers falling out of the pockets, the tongue-shaped elements are disposed radially inside the rolling-element bearing cage (FIGS. 2 and 3). Here the tongue-shaped elements secure the rollers from falling out of the pockets in the radial inward direction. For this purpose the transport-securing unit includes radially outer-lying regions 32 against which those rollers abut that would be moved radially inward by a force, for example, the weight force. At its bridges 36 that delimit the pockets in the circumferential direction the rolling-element bearing cage 14 includes regions that prevent a moving-out of the rollers radially outward from the pockets. In this way the transport-securing unit, in cooperation with the rolling-element bearing cage 14, captively secures the rollers in the pockets. The transport-securing unit is an element that is formed separately from the rolling-element bearing cage 14. Furthermore, it is formed one-piece. In the above-described design of the unit it is self-retaining. For this purpose the tongue-shaped elements are retained at the regions 32 behind the rollers so that a falling-out of the transport-securing unit in an axial direction, which points from the tips 24 to the annular region 22, is prevented. At the same time the annular region abuts against an end side of the rolling-element bearing cage 14, so that a relative movement of the transport-securing unit in a further axial direction, which points from the annular region to the tips, relative to the rolling-element bearing cage 14 and the rollers 12, is not possible. Consequently, the rolling-element bearing cage, the rollers, and the transport-securing unit are attached to one another and are thus self-retaining.

To install the unit made from the rolling-element bearing cage 14, the rollers 12, and the transport-securing unit, the rollers are first disposed in the pockets of the cage, and then the tips 24 of the transport-securing unit are introduced centrally in the axial direction into the rolling-element bearing cage 14 at a first opening of a central through-hole of the rolling-element bearing cage 14, which through-hole opposes a second opening of the central through-hole, wherein the first opening has a smaller diameter than the second opening. As the tongue-shaped elements move into the through-hole they make contact with the rollers. Here the tongue-shaped elements are elastically deflected radially inward, so that the transport-securing unit can be introduced further into the cage in the axial direction, which is continued until the annular region meets the mentioned end side of the rolling-element bearing cage 14. Then the above-described position of the unit is achieved, which is self-retaining.

To install the rolling-element bearing cage 14 and the rollers 12 on an inner ring 34 of a tapered roller bearing (FIGS. 2 and 4), the unit including the tips 24 is moved forward in the axial direction 26 toward a side of the inner ring that has a smaller diameter until the tips 24 meet the inner ring. Then a force is again exerted in the axial direction 26 on the rolling-element bearing cage 14 and the rollers 12, so that the tips 24 are pressed radially inward, and the rolling-element bearing cage and the rollers slide over the tips 24 onto the inner ring, while the rollers 12 remain disposed inside the pockets, and the transport-securing unit is held from a further moving in the axial direction 26 by the end side of the inner ring, so that the transport-securing unit is thereby removed from the rolling-element bearing cage 14 and the rollers 12. The rollers are thus also moved up to a position in a raceway 38 of the inner ring 34.

The individual tongue-shaped elements 18 are configured geometrically identical. They each include a radially outer-lying tip 42. At an axial end that opposes the annular region 22, an insertion bevel 40 is disposed that is formed by a radially outer-lying surface that extends obliquely with respect to the axial direction 28 (FIGS. 4 and 2). A bevel surface 44 that is disposed axially between the tip 42 and the annular region is also radially outer lying, and during an installation of the rolling-element bearing cage 14 and the rollers 12 on the inner ring 34 ensures, together with the regions 32, an elastic deflecting of the tongue-shaped elements radially inward, so that the rolling-element bearing cage and the rollers can be stripped off in the axial direction. In a state wherein the transport-securing unit is removed from the rolling-element bearing cage 14 and the rollers 12, the tip 42 is disposed radially farther outward than the angular surface 44 and the insertion bevel 40.

The transport-securing unit is formed from plastic.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved transport-securing units.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Transport-securing unit
12 Rollers

14 Rolling-element bearing cage
16 Unit
18 Element
20 Circumferential direction
22 Region
24 Tip
26 Axial direction
28 Central axis
30 Pocket
32 Region
34 Inner ring
36 Bridge
38 Raceway
40 Insertion bevel
42 Tip
44 Bevel surface

What is claimed is:

1. A transport-securing unit for retaining a plurality of rollers in a rolling-element bearing cage during transportation, the transport-securing unit comprising:
   an annular region; and
   a plurality of axially extending, circumferentially spaced elastically deflectable projections extending from the annular region,
   wherein a radially outer side of each of the projections includes a first surface sloping radially inward and facing away from the annular region.

2. An assembly comprising:
   the transport-securing unit according to claim 1, and
   a rolling-element cage and a plurality of rollers in pockets of the rolling-element bearing cage,
   wherein the transport-securing unit is formed separately from the rolling-element bearing cage,
   wherein the projections extend inside the cage and limit radially inward movement of the rollers relative to the cage, and
   wherein a largest circle that bounds the projections has a greater diameter than a smallest opening defined by the rollers in the pockets.

3. The assembly according to claim 2, wherein the projections comprise tongues.

4. The assembly according to claim 2,
   wherein the projections are located entirely radially inwardly of the rollers.

5. The assembly according to claim 2,
   wherein the transport-securing unit comprises a jig.

6. The assembly according to claim 2,
   wherein each of the projections includes a portion that is elastically deflectable in a radially inward direction.

7. The assembly according to claim 6,
   wherein the projections are located entirely radially inwardly of the rollers.

8. The transport-securing unit according to claim 1,
   wherein the radially outer side of each of the projections includes a second surface sloping radially inwardly and facing toward the annular region.

9. The transport-securing unit according to claim 8,
   wherein the first surface meets the second surface at a line, and
   wherein the lines of each of the projections form chords of an imaginary circle surrounding the projections.

10. An assembly comprising:
    a rolling-element bearing cage having a cage interior and having a plurality of pockets,
    a plurality of rollers respectively mounted in the pockets, and
    a transport-securing unit removably mounted in the cage interior, the transport-securing unit limiting radially inward movement of the rollers to retain the rollers in the bearing cage,
    wherein the transport-securing unit includes a plurality of circumferentially spaced, axially extending tongues in contact with the rollers,
    wherein the transport-securing unit includes at least one annular region from which the plurality of tongues extend, and
    wherein each of the tongues includes an end portion that is elastically deflectable in a radially inward direction.

11. The assembly according to claim 10
    wherein the tongues include radially outer-lying regions abutting against the rollers to captively secure the rollers in the pockets of the cage.

12. A method of mounting a bearing cage containing rollers on a bearing inner ring, the method comprising:
    providing the assembly according to claim 10;
    placing the tongues against the bearing inner ring,
    sliding the rollers and the bearing cage off the tongues and onto the bearing inner ring, and
    moving the transport-securing unit away from the bearing inner ring.

13. The assembly according to claim 10,
    wherein the transport-securing unit comprises a jig.

14. An assembly comprising:
    a rolling-element bearing cage having a cage interior and having a plurality of pockets,
    a plurality of rollers respectively mounted in the pockets, and
    a jig removably mounted in the cage interior and holding the rolling elements in the pockets of the bearing cage,
    wherein the jig includes a plurality of axially extending, circumferentially spaced projections extending from the annular region, and
    wherein a largest circle that bounds the projections has a greater diameter than a smallest opening defined by the rollers in the pockets.

* * * * *